Patented Feb. 19, 1946

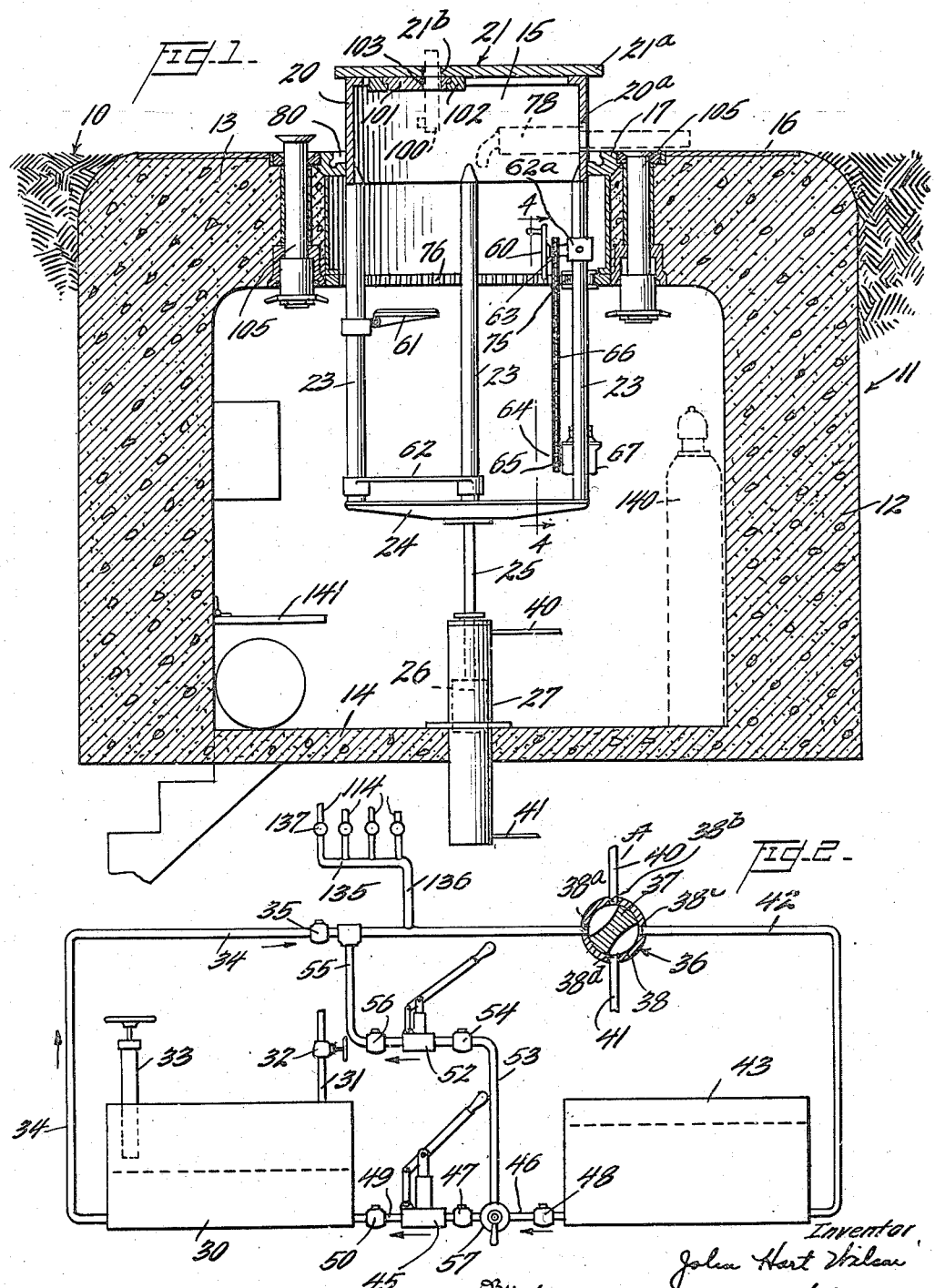

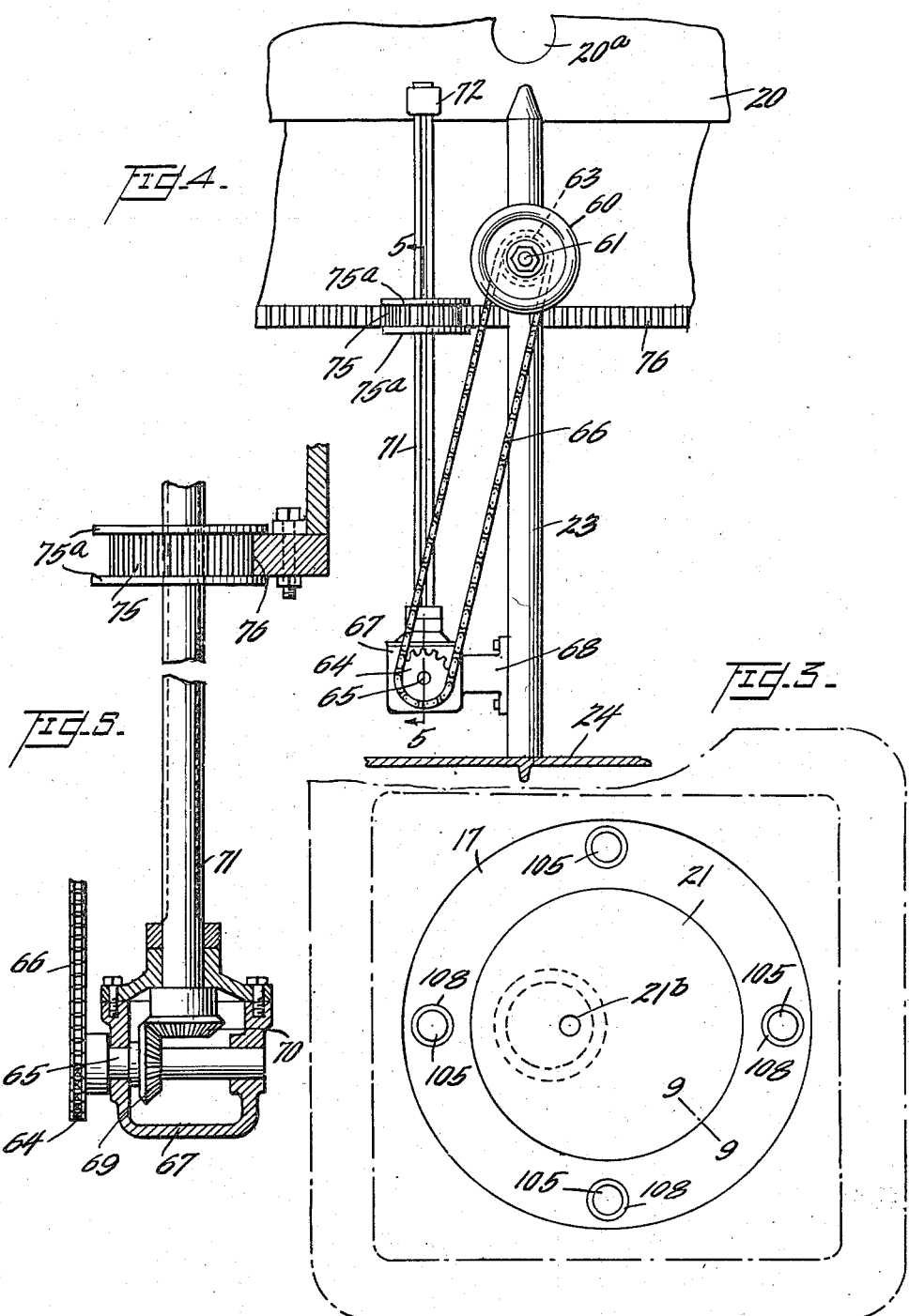

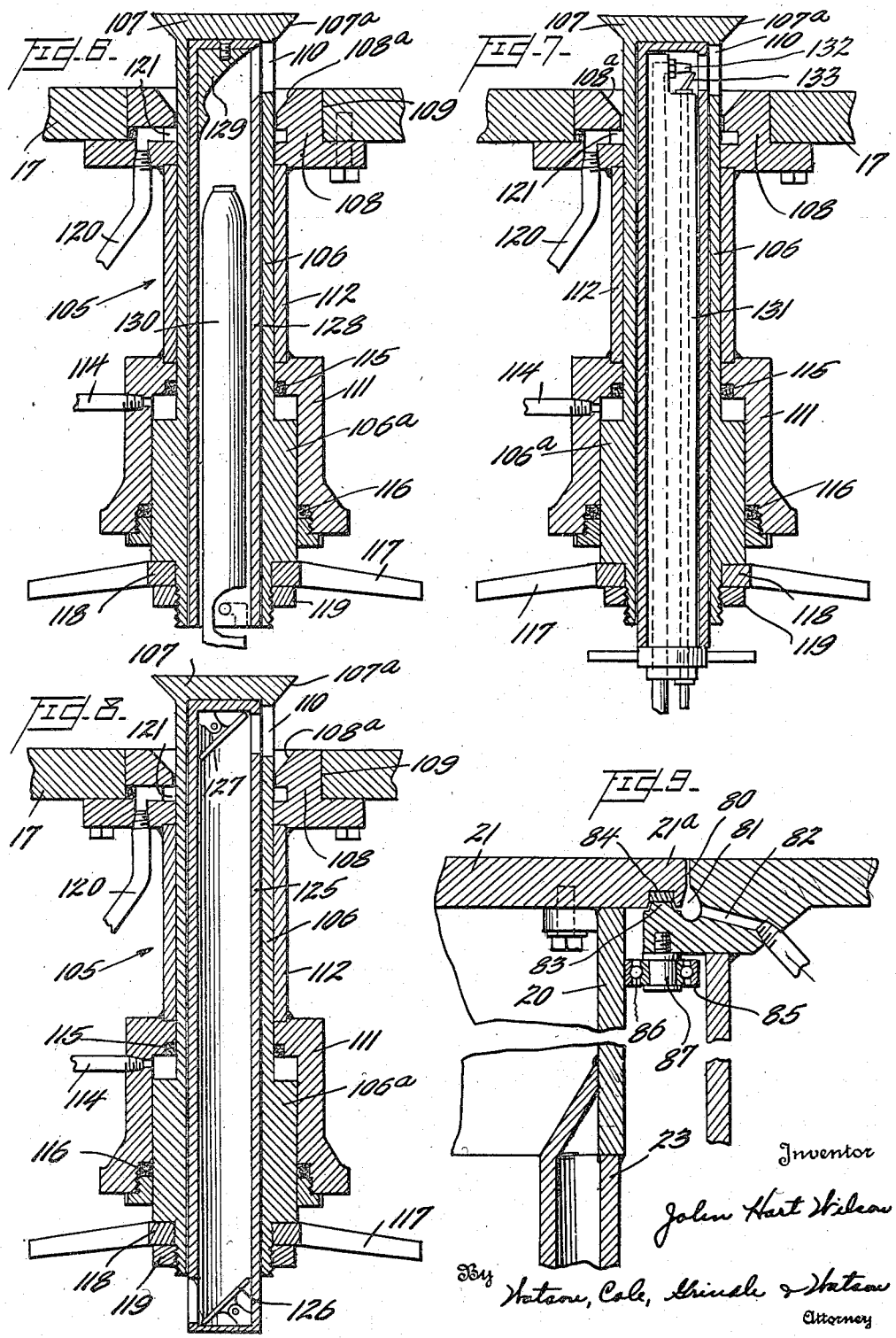

2,395,310

UNITED STATES PATENT OFFICE 2,395,310

ARMAMENT STRUCTURE

John Hart Wilson, Wichita Falls, Tex.

Application September 10, 1942, Serial No. 457,859

3 Claims. (Cl. 89—36)

The present invention relates to armament structures and particularly to static or permanently placed fortifications.

For the defense of harbors, cities, depots, and the like, numerous types of permanent fortifications have heretofore been designed or suggested and many have been placed in actual use, as is well known. The problem of defending aircraft landing fields, however, is one which has only comparatively recently been presented and as yet no entirely satisfactory type of defense armament structure primarily intended for the effective defense of an aircraft landing field has been perfected. In a well defended airfield the landing runways themselves should be made unusable by enemy aircraft at any time while at the same time they should be capable of being used by aircraft of the defending forces at all times except when the threat of enemy landings exists and the runways are not in use by the home forces. It of course has been suggested that air fields may be rendered unserviceable to enemy aircraft by placing objects of various kinds, such for instance as trucks and automobiles, about the field at various points and particularly across the runways. When a runway is so blocked it does, of course, become unusable, but it becomes unusable to friend and foe alike and a very considerable amount of time must be expended in the removal of the objects placed on the runways before the runways can be used again by defending planes. Various modified forms of this obstacle placing system have been suggested and tried out, but for the most part those concerned with the defense of airfields have deemed it best to protect the field by concealment, wherever possible, and by means of batteries of guns of large and small caliber located at various points around the field and to the sides of the runways. Such defensive means cannot always be effective to prevent enemy landings and it is deemed to be necessary in order to positively prevent the occurrence of such landings to actually render the runways unusable. Furthermore it is highly desirable to have positioned at all times, closely adjacent the runways, guns of various types, particularly machine guns for repelling air borne troops, and anti-tank guns for destroying attaching vehicles.

In accordance with the present invention an improved air field defensive armament of the static or permanently placed type is provided. It is so constructed as to embody the superior points of advantage of the two types of defensive means heretofore employed, i. e., gun emplacements and runway obstructing articles without, however, having the disadvantgaes of either. In a preferred form of the invention a compartment for a gunner is created beneath the level of the surface of the air field, within the limits of a runway and better still at the intersection of two runways, the compartment having heavy walls of steel or concrete of sufficient strength to protect the occupant against injury due to the explosion of bombs or shell fire, except under direct hits, and having the upper surface of its roof or top in the plane of the runway. The roof of the compartment is provided with an aperture of substantial size within which is positioned a vertically adjustable turret which is also rotatable about a vertical axis. The turret top is flat so that, when the turret is in its lowermost position, the upper surface thereof lies in the plane of the field or runway and offers no hindrance to the free movement of aircraft along the runway in landing or taking off. This is the normal position of the turret and the position which it will occupy at all times except when it is desired to render the runways unusable and to place the field in condition for defense against the air borne troops or land vehicles such as tanks. When attack threatens the turret is elevated by a mechanism under the control of its occupant and immediately becomes an obstruction of such size and character as to make it impossible for an airplane to safely make a landing. Elevation of the turret likewise uncovers a gun port in its side wall through which the occupant of the turret may direct a gun, such as a machine gun or an anti-tank gun, for the purpose of destroying enemy troops or enemy war vehicles of any kind which may have been landed from the air by any method or which may have been driven onto the field.

The turret elevating mechanism is so designed and constructed that, after elevation, the turret may be rotated in order that a gun projecting through the gun port may be trained in any desired direction. It is preferably provided with an aperture in its top through which an observation instrument may be passed so that an unobstructed view in all direction may be obtained by the occupant, even when the turret is in lowered position.

As it is possible that a defensive structure of the type described may be attacked from many sides at once and put out of action despite the efforts of its occupant, it is so designed that it may be quickly and positively lowered to inoperative position upon the appearance of overwhelming forces. It is also provided with auxiliary means to enable the occupant, after retraction of the turret in the face of overwhelming enemy forces, to repel attempts of any such forces to destroy the structure by locally attacking the turret top with explosives or poison gas. Thus, when the turret is lowered it might be a comparatively easy task to destroy it and its occupant unless means is provided for keeping the attackers at a distance. Naturally, the retracted turret presents no target for guns, lying completely below the level of the ground surface, and the turret and its compartment cannot be destroyed unless attacked by persons who closely approach it.

In accordance with the invention auxiliary means is provided for projecting horizontally over the upper surface of the turret, when retracted, or in any direction desired, a flame or a stream of bullets from a machine gun, or both. Means is also associated with the turret for blowing away with compressed air any gases which would otherwise tend to flow into the turret and compartment either through the crevices in the turret top or through the crevices of the auxiliary means just referred to. By providing a turret structure of the type described a very considerable portion of a relatively large air field can be effectively guarded by a single defending soldier and by the use of a relatively few of such structures it will be possible to defend against enemy attacks an air field of large size. Where more than one turret structure is employed they may be interconnected by passageways and, where one only is used a passageway beneath the ground level may be provided to permit the entry and exit of a defending soldier regardless of conditions upon the surface of the field.

A preferred form of the invention will be described in detail and is illustrated in the accompanying drawings. It will be appreciated, however, that in adapting the invention for use in various localities and for special purposes, the details of design and arrangement of its component elements may be substantially modified without departure from the spirit of the invention.

In the drawings:

In Figure 1 of the drawings, the level of the sur-armament structure showing the compartment and the turret associated therewith, the turret being in elevated or operative position;

Figure 2 is a schematic view of a fluid pressure-operated mechanism for effecting vertical movement of the turret;

Figure 3 is a top plan view of the compartment showing the turret top centrally located;

Figure 4 is a section on line 4—4 of Figure 1;

Figure 5 is a section on line 5—5 of Figure 4;

Figure 6 is an axial section through one of the auxiliary elements, the element being shown to be adapted for use in association with a machine gun;

Figure 7 is a similar view, the auxiliary defensive element, however, being in this case adapted to be used in association with a flame projector;

Figure 8 shows a similar element provided with a periscope device; and

Figure 9 is a section on line 9—9 of Figure 3.

In Figure 1 of the drawings, the level of the surface of the ground, which may be the runway of an air field or any other field, roadway or street which is to be defended with the aid of a structure embodying the features of the invention, is indicated by the numeral 10. Located wholly beneath the level of the surface 10 is a compartment for the occupancy of one or more defending soldiers, the thick heavy wall of the compartment being indicated at 11, the wall including a cylindrical part 12 which comprises the side wall and the relatively flat top 13 and floor 14. The side wall 12 or floor 14 may be provided with an aperture for the entrance and exit of a soldier and the top 13 is provided with a central cylindrical aperture within which is positioned the turret structure 15. The compartment walls may be of reinforced concrete or steel but, in any event, are sufficiently heavy to protect the occupant of the compartment against bombs or projectiles other than against direct hits by bombs or projectiles of large caliber. The top of the compartment may advantageously be armored, as for instance by a plate 16 of steel and, encircling the turret structure 15, is a relatively heavy metallic ring 17 the upper surface of which is flush with the surface of plate 16, the turret being guided in its vertical movements by this encircling stationary ring.

The turret itself is of simple construction, including a cylindrical side wall 20 and a flat circular steel plate 21 secured to the top of the cylindrical portion 20, the diameter of the top plate 21 being slightly greater than the diameter of the cylinder 20 to provide the annular overhanging portion or flange 21a. The turret supporting and adjusting means includes four vertically disposed parallel posts 23 the upper ends of which are secured to the annular lower edge of the cylindrical portion 20 of the turret and the lower ends of which are rigidly mounted upon a platform 24. The platform 24 is in turn mounted upon the upper end of a piston rod 25 to the lower end of which is affixed the piston 26 slidably engaging the inner wall surface of the vertically disposed cylinder 27. The piston 26 and hence piston rod 25 and the superposed turret supporting structure and turret may be vertically moved at the will of the operator, with the aid of fluid pressure means, for creating an increased pressure below or above the piston as desired and evacuating the fluid from the cylinder upon the opposite side of the piston.

In Figure 2 of the drawings the fluid pressure mechanism is schematically illustrated, a liquid such as oil being the fluid which is caused to make actual contact with the piston 26 and air under pressure being preferably employed to impart pressure to the liquid. Thus a closed storage tank for liquid is indicated at 30 and a conduit for leading air under pressure into this tank, at the top thereof, is indicated at 31. The means for placing air under compression is not illustrated, but it will be understood that any suitable pump may be employed for this purpose. A hand operated valve 32 may be closed in the event that the air pump becomes inoperative and the air pressure in chamber 30 created by means of an emergency hand pump such as indicated at 33. Liquid in the bottom of chamber 30 may flow out of this chamber through duct or conduit 34, past check valve 35, to a manually operable control valve which is diagrammatically illustrated and is indicated at 36. The valve member proper of valve 36 is indicated at 37 and the valve casing 38 is shown to have four ports indicated respectively 38a, 38b, 38c, and 38d. With the valve member 37 in the position in which it is shown in Figure 2, the ports 38a and 38b are in communication and fluid under pressure may then flow from tank 30 through pipe 34 to the valve and through the valve to pipe or conduit 40 which is in communication with cylinder 27 at its upper end. Likewise ports 38c and 38d are in communication so that liquid from cylinder 27 and below piston 26 may escape through conduit 41, passing through valve 36 from port 38d to port 38c and thence into a conduit 42 by means of which it is conducted into an open tank 43 comprising a storage tank. With the valve member 37 in the position shown pressure will be exerted above the piston to force the piston down and the turret will thus be lowered and the liquid escaping from the lower end of the piston returned to open tank 43. If the valve member 37 be so rotated the ports 38a and 38d are brought into communication, and likewise ports 38b and 38c, fluid under pressure will be conducted through pipe 41 to the lower end of the cylinder 27 and the piston and turret elevated, liquid escaping from the upper end through pipe 40 and passing to tank 43.

After repeated operations of the turret elevating and lowering mechanism it will be necessary to return some of the liquid collected in tank 43 back to the pressure chamber 30 and to effect this a hand pump 45 is provided, the intake of this pump being connected to tank 43 by conduit 46 provided with check valves 47 and 48 and the outlet port of the hand pump being connected to the pressure chamber 30 by conduit 49 having associated therewith the check valve 50. It will thus be seen that none of the operating liquid is wasted but will be used over and over again. If desired the pressure tank 30 can be by-passed and vertical movements of the piston 26 and the turret can be effected by fluid placed under pressure directly by a hand pump, such as indicated at 52. The intake of pump 52 is connected to the conduit 46 by a tube or duct 53, a check valve 54 being associated with duct 53 and the outlet of hand pump 52 is connected by conduit 55 to duct 34 just beyond check valve 35, a check valve 56 being associated with conduit 55. A control valve is indicated at 57 and this valve is normally positioned to prevent entry of liquid into the duct 53 and permit passage of liquid from tank 43 to chamber 30. The valve, however, may be manipulated to cut off communication between tank 43 and chamber 30 and to open communication between conduit 46 and conduit 53, which adjustment is made when it is desired to effect the elevation and lowering of the turret by means of the hand operated pump 52. In either event the turret is not only elevated by fluid pressure, but is positively lowered by fluid pressure and may be quickly raised or lowered even when compressed air is not available to place the operating fluid under pressure.

A feature of the invention consists in the support of the turret structure by means which will not only facilitate rapid vertical adjustment of the turret but which will likewise permit the turret to freely revolve. Thus, in the form of the invention which has been selected for disclosure the piston 26 is freely rotatable in the cylinder 27 and hence the turret as a whole is freely rotatable. This is essential in order that the gun port, which is indicated at 20a, may be angularly adjusted to permit discharge of projectiles therethrough in any desired direction. The means for rotating the turret is so constructed as to permit its rotation in any position to which it may be vertically moved, except only when it is completely lowered. This means includes the hand wheel 60 within convenient reach of the turret occupant, who will normally be seated upon the support or seat 61 or standing upon the platform 62. The hand wheel 60 is fixed upon the inner end of the shaft 61 rotatably supported in a bearing 62a secured upon post 23, a sprocket 63 fixed on shaft 61 being operatively connected to a sprocket 64 fixed upon a shaft 65 disposed below and parallel to shaft 61, by means of a sprocket chain 66.

Shaft 65 is supported in spaced bearings in a frame 67 mounted upon the end of a bracket 68 secured to the lower end of turret post 23. Within frame 67 and fixed upon shaft 65 is a bevel gear 69 the teeth of which mesh with those of a bevel wheel 70 fixed upon the lower end of a vertically extending shaft 71 the upper end of which is rotatably supported in a bearing 72 secured to the side wall of the turret. By rotating hand wheel 60 the shaft 71 is caused to rotate about a vertical axis. The entire turret revolving mechanism so far described will rise and fall vertically with the turret structure as a whole.

Splined upon shaft 71 is a shrouded pinion 75, the teeth of which are in mesh with those of a circular rack 76 which is fixed or rigidly supported upon the compartment wall directly below the ring 17. As the circular rack 76 is stationary at all times, it is clear that the operator may revolve the turret by revolving the hand wheel 60 and thus cause the pinion 75 to move along the rack 76, the disc-like shrouding elements 75a of the pinion preventing vertical movement of the pinion relatively to the rack. By rotating the turret a gun, for instance a machine gun such as indicated in dotted lines at 78 in Figure 1, may be revolved so as to sweep over all areas of the field adjacent the turret, or a gun of larger caliber may be projected through the port 20a and maneuvered at the will of the operator.

When the turret is lowered the overhanging peripheral edge 21a or flange of the top plate 21 of the turret is received within an annular groove 80 formed in the turret encircling ring 17, as most clearly shown in Figure 9. While the distance between the edge face of flange 21a and the vertical wall of groove 80 is relatively slight adjacent the upper faces of plate 21 and ring 17, each is preferably cut away below so as to form a circular cavity 81. Leading to cavity 81 is a duct 82 through which air under pressure may be led, to be discharged into this cavity. When compressed air from a suitable source is so discharged into the cavity 81 it will eventually find its way upwardly and emerge as an annular jet around the periphery of plate 21 thus blowing away from the joint between the periphery of plate 21 and the ring 17 any gas which might otherwise tend to flow downwardly through this crevice and eventually make its way into the compartment. An occasional application of compressed air in this manner will prevent the inflow of even the heavier gases in amounts sufficient to endanger the occupant of the compartment. In order to insure that compressed air must flow upwardly in the specified manner rather than inwardly into the compartment through any gap or crevice between the horizontal mutually facing surfaces of flange 21a and the bottom of groove 80 of ring 17, a tapered upwardly projecting rib 83 is formed on ring 17 and a downwardly flaring annular groove 84 is formed in the undersurface of flange 21a.

When the turret is lowered the upwardly tapering circular rib 83 enters the downwardly flaring annular groove 84 and these two inter-engaging parts together constitute a seal, preventing the passage of compressed air. A ring of resilient cushioning material may be housed within groove 84, if desired, to compensate for any possible unevenness in the faces of the groove and rib. If desired, anti-friction devices such as indicated generally at 85 in Figure 9 may be employed to laterally support the cylindrical wall of the turret and maintain the turret in axial alignment with cylinder 27 at all times. These anti-friction devices may be formed in various way and that illustrated is shown by way of example only, comprising a ball bearing 86 mounted upon a stationary short cylindrical member 87 secured to the underside of ring 17. The outer race of the ball bearing bears against the cylindrical face of the turret and when a plurality of these anti-friction devices are employed the turret will remain effectively centered both during its vertical adjustments or rotation.

In order that the turret occupant may have a view in any desired direction, the top plate 21 is apertured at 21b and through this aperture an observation device such as a periscope 100, indicated in dotted lines in Figure 1, may be projected. In order to seal the aperture 21b, eccentric disc 101 is provided, this disc being supported by a circular flanged member 102 secured to the underside of plate 21 and having therein an aperture 103 which is adapted to be brought into register with the aperture 21b of plate 21 to permit the passage of the observation device, or to be rotated so that aperture 103 is out of register with aperture 21b, thus sealing the last mentioned aperture.

As previously stated it is highly desirable to provide, in addition to the turret structure described, auxiliary devices which the compartment occupant may manipulate after he has lowered or retracted the turret to prevent the enemy from directly attacking the turret top from above. Preferably four such appliances are employed, each being generally indicated at 105 in the drawings. Each of these devices includes a tubular member 106 closed at its upper end and open at its lower end. The upper end closure 107 has a peripheral flange, the lower face of which is frusto-conical and tapers downwardly, as indicated at 107a, this frusto-conical face being adapted to seat upon the upwardly flaring frusto-conical seating surface 108a of an annular member 108 secured within an aperture 109 formed in the turret encircling ring 17. When tubular member 106 is in its lowermost position and surface 107a thereof is seated upon the seating surface 108a of member 108, the upper face of the top 107 of the tube lies flush with the surface of the turret encircling ring 17 or, in other words, lies flush with the surface of the field, which is indicated by the numeral 10. When elevated, however, as indicated in Figure 6, a port 110 formed in the cylindrical side wall of the tubular member is exposed and through this port projectiles or liquid fuel may be directed.

It will be observed that the lower end of tubular member 106 is enlarged and that this enlarged portion 106a, which is cylindrical, lies within a short cylinder 111 attached as by welding to the lower end of a tube 112, the upper end of which is secured to the previously mentioned insert 108. A conduit 114 is provided for leading fluid under pressure into the interior of cylinder 111 at the upper end thereof and packing rings 115 and 116 are provided to prevent escape of liquid from the cylinder. When fluid under pressure is introduced into the cylinder through duct 114 a pressure will be exerted upon the annular surface of the upper end of the enlargement 106a and member 106 will be forced downwardly until the surfaces 107a and 108a are in contact, thus effectively closing the port 110. For the purpose of elevating the tubular member 106 handles 117 are provided, these handles extending outwardly from a central ring or hub 118 which is secured to member 106 just below the enlargement 106a by a threaded nut 119. A compressed air duct is indicated at 120 and it is seen that this duct opens into an annular channel 121 formed in block 108 and encircling the aperture within which tubular member 106 is located. Air under pressure is discharged into annular duct 121 for either of two purposes, i. e., to blow from the frusto-conical seating surface 108 any dirt or particles which may have been collected and which may tend to prevent the occupant of the structure from completely lowering the tube 106 or alternatively, to blow from the vicinity of the joint between the surface 107 and 108 any gas which might be flowing over the field to be defended. By occasional application of compressed air at appropriate times these two functions may be adequately accomplished.

Tube 106 may receive any one of a number of instrumentalities for defense. It is shown in Figure 8 to have received within it a periscope device 125 with lower and upper mirrors 126 and 127, respectively, the occupant of the compartment being enabled to observe by means of the periscope what is happening on the field above, in any direction, tube 106 being freely rotatable. Or there may be inserted within tube member 106 a second tube, indicated at 128 in Figure 6, having secured within the same at its upper end a spatter plate 129 for small arms ammunition such as might issue from the muzzle of a machine gun 130 directed upwardly through the tube to the approximate position shown in Figure 6. The spatter plate 129 will deflect bullets from gun 130 through the firing port 110 in a substantially horizontal direction. In Figure 7 there is illustrated a flame-throwing device indicated by the numeral 131, which may be of any suitable type having a liquid fuel nozzle 132 at its upper end and horizontally disposed so as to direct a stream of fuel through the port 110. A sparking element 133 causes this fuel to ignite and hence an elongated horizontally projected flame will result. Other types of weapons may be used in combination with the vertically adjustable tubular members 106 the purpose of all of which is to enable the occupant of the compartment to defend himself and his armament structure when the turret is retracted.

Fluid pressure conduit 114 associated with each of these devices is preferably supplied with fluid under pressure from the turret operating fluid pressure system previously described, and which is illustrated in Figure 2. Thus each such duct 114 may be connected to the pressure line 34 previously referred to, as by means of a manifold 135 and duct or conduit 136. Valves 137 control the flow of fluid under pressure from manifold 135 to the several conduits 114 and each of these valves is so designated that, when turned in one direction, there is free communication between the associated duct 114 and the manifold 135 and, when turned in the opposite direction, this communication is interrupted and the interior of duct 114 is brought into communication with the outside atmosphere to permit the pressure therein to fall and thus make it possible for the compartment occupant to manually elevate the associated tubular member 106. The wastage may, if desired, be returned to the open tank 43 by conduits which are not illustrated. If desired, of course, air under pressure instead of liquid may be transmitted through the ducts 114 for the operation of the tubular members 106 and in this event no return line will be necessary.

The compartment may be provided with one or more oxygen flasks such as indicated at 140, a bench or bunk such as indicated at 141, receptacles for supplies, telephones, lighting appliances, and any other devices useful to its occupant.

Having thus described the invention, what is claimed as new and desired to be secured by Letters Patent is:

1. An armament structure of the type described comprising, in combination, a turret mounted for rotation and vertical movement, said turret having a peripheral outwardly projecting flange at its top, a stationary compartment the top of which is provided with a turret encircling member having a circular recess to receive said flange when the turret is in lowermost position, and means for discharging air under pressure into said recess, for the purpose set forth.

2. An armament structure for the protection of air fields comprising a compartment having an aperture in its top encircled by a horizontal plate, a turret in said aperture, means supporting the turret for vertical adjustment whereby the turret top may be positioned in or above the plane of said plate, and a vertically disposed and vertically adjustable tubular element having its upper end closed and a discharge port in its side, said element being located laterally of said turret and extending through a port in said plate, said port being exposed when the element is elevated and covered by said plate when the element is lowered, for the purpose set forth.

3. The combination set forth in claim 2 in which fluid pressure operated means is provided for the purpose of forcing the said element into lowered or inoperative position.

JOHN HART WILSON.